(No Model.)  2 Sheets—Sheet 1.

E. B. COOK.
Windmill.

No. 230,614.  Patented Aug. 3, 1880.

Witnesses.
S. N. Piper
W. H. Lunt

Inventor.
Emory Bangs Cook.
by attorney
R. H. Eddy (No Model.) 2 Sheets—Sheet 2.

E. B. COOK.
Windmill.

No. 230,614. Patented Aug. 3, 1880.

Witnesses.
S. N. Piper
H. H. Lunt

Inventor.
Emory Bangs Cook
by attorney.
R. H. Eddy

N. PETERS, PHOTO-LITHOGRAPHER, WASHINGTON, D C.

UNITED STATES PATENT OFFICE.

EMORY B. COOK, OF NORTH BELLINGHAM, MASSACHUSETTS.

WINDMILL.

SPECIFICATION forming part of Letters Patent No. 230,614, dated August 3, 1880.

Application filed May 17, 1880. (No model.)

*To all whom it may concern:*

Figure 1:
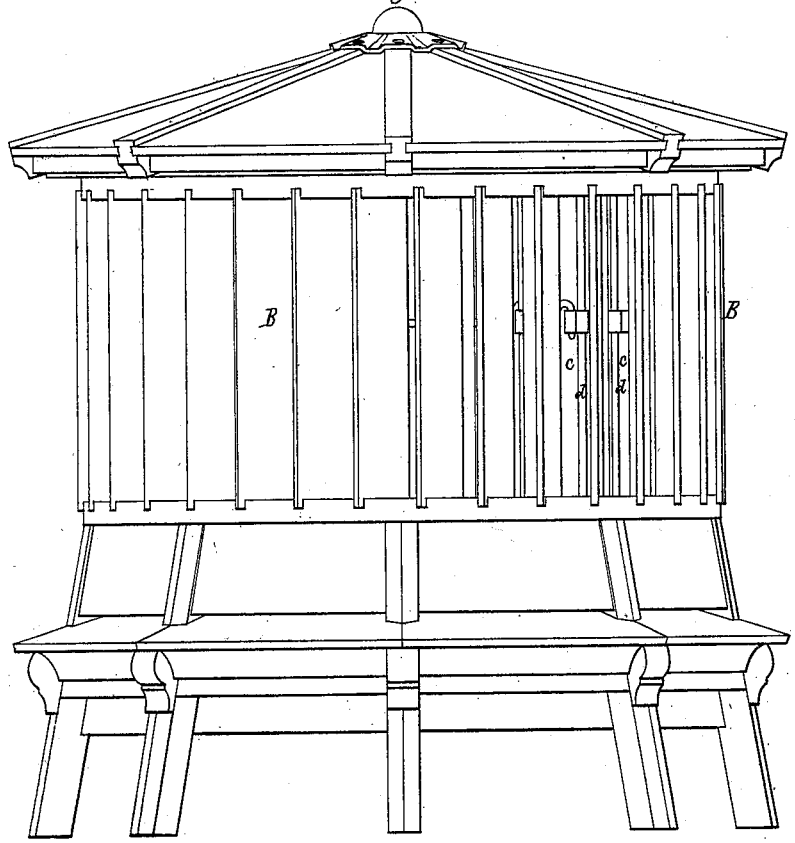
Figure 3:
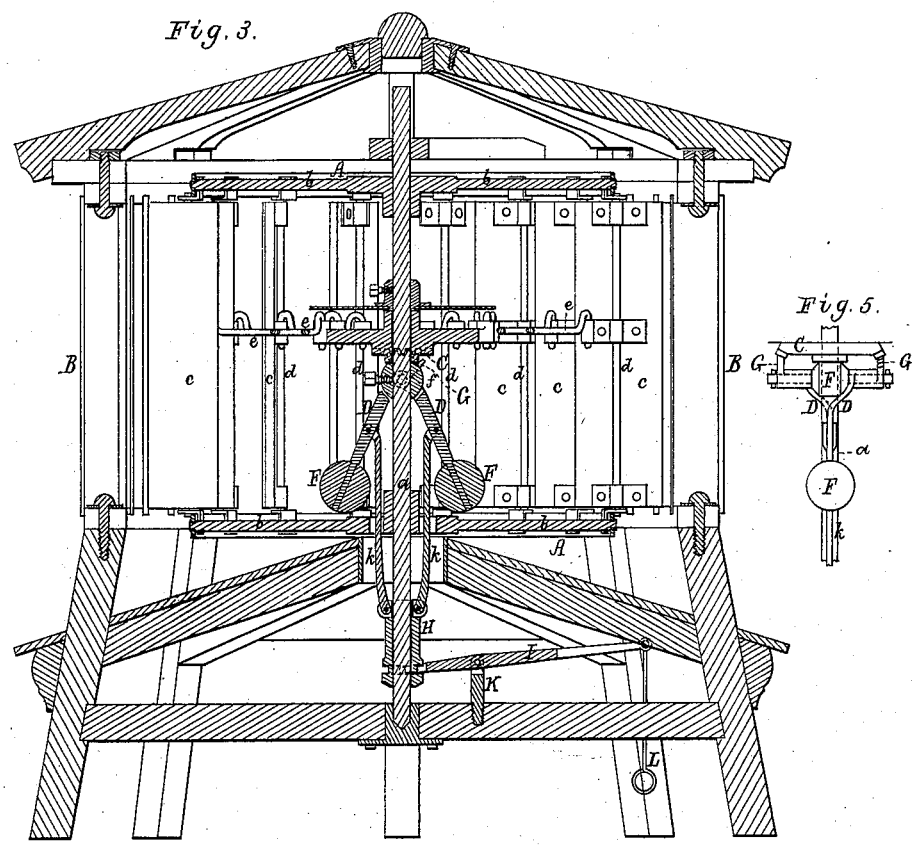
Figure 5:
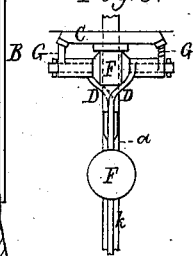
Figure 2:
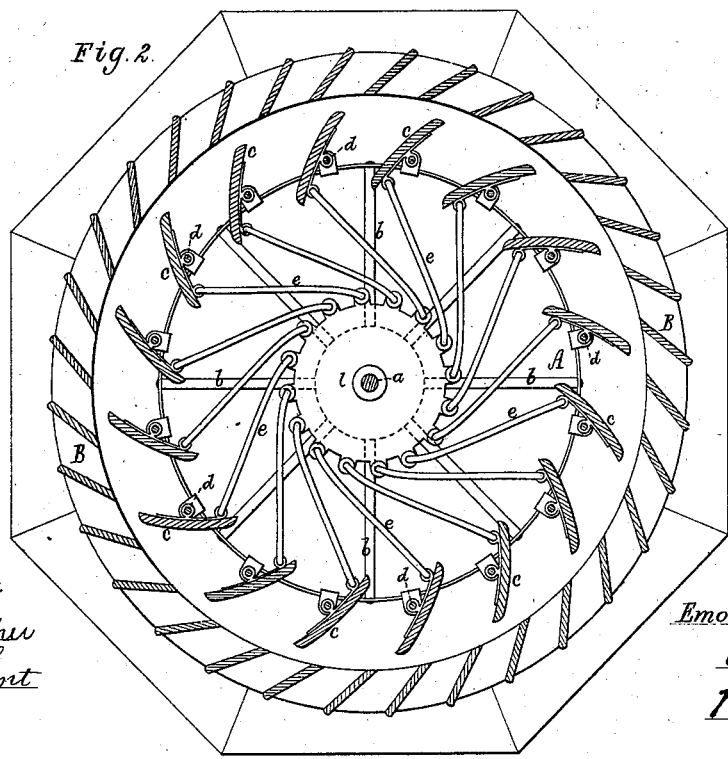

Be it known that I, EMORY BANGS COOK, of North Bellingham, in the county of Norfolk and State of Massachusetts, have invented a new and useful Improvement in Windmills or Wind-Wheels; and I do hereby declare the same to be described in the following specification, and represented in the accompanying drawings, of which—
Figure 1 is a side view, Fig. 2 a horizontal section, and Fig. 3 a vertical section, of a windmill provided with my invention, the nature of which is fully defined in the claim or claims hereinafter presented. Fig. 5 is a view of the cross-head and sectors, to be hereinafter described.

The object of my invention is to adjust the vanes of the wheel, as the force of the wind may increase or diminish, in order that the pressure of wind operating on the said vanes to revolve the wheel may be equalized from time to time.

In the drawings, A denotes the wind-wheel surrounded by a stationary circular shrouding or blind, B, having its vertical slats arranged at equal distances apart and in directions to cause the wind, in passing between them in order to revolve the wheel, to impinge upon its vanes to the best advantage. The wheel, arranged within its stationary annular blind or shrouding concentrically, is supported by a vertical shaft, *a*, and is composed in part of two heads or spoked wheels, *b b*, arranged concentrically and at a suitable distance apart upon such shaft. The vanes *c* of the wheel extend between the rims of the two heads, and at or near their middles the said vanes are pivoted to or are applied to turn on rods *d*, extending from one to the other of the spoked heads.

A gear-wheel, C, turns freely on the wind-wheel shaft, and is connected with the several vanes by a series of arms or rods, *e*, projecting from it to them, and pivoted both to it and them, the same being so that on turning the gear on the shaft the vanes shall simultaneously be turned on their sustaining-rods. Underneath the said gear there is pivoted to the shaft, or to a cross-head, *f*, affixed thereon, two arms, D, each having a ball or weight, F, fixed to it at its lower end. Each of the said arms has extending upward from it, above its pivot, a toothed sector, G, to engage with the gear above mentioned, the shaft being midway between the said toothed sectors.

From the above it will be seen that during the revolution of the wind-wheel the weighted arms and toothed sectors will revolve with it, and should the velocity of such wheel increase the increased centrifugal force generated in the weighted arms will move them outward, and thereby, by means of the sectors, turn the gear more or less in a manner to cause the vanes of the wheel to approach one another, or vary their angular positions. On the force of the wind diminishing, so as to operate with less effect on the wheel, the vanes thereof will be moved more or less apart, to cause the wind to operate with greater power on the wheel. Thus, as the velocity of the wind or the duty to be performed by the wheel may vary, the rotary motion of the wheel will be kept at or about one uniform rate or speed.

Jointed to a sleeve, H, adapted to the wheel-shaft to encompass it and to slide vertically on it, are two arms, *k*, which extend upward and are jointed to the weighted arms D. The sleeve is grooved transversely to receive the prongs of a forked lever, I, fulcrumed to a stationary post, K, the said lever having a wire or rod, L, extending down from its free arm. On pulling the arm downward the vanes of the wheel may be closed upon each other, so as to prevent the wheel from being revolved by the wind.

In obtaining the proper obliquity of each of the slats of the annular shrouding I have found that when the angle made by the radius of the wheel and the direction of the obliquity of a slat has its vertex in the pivotal axis of the slat, and the slat stands at equal angles to the lines of the said angle, such angle should be one hundred and eight degrees of a circle, or substantially so.

Figure 4:
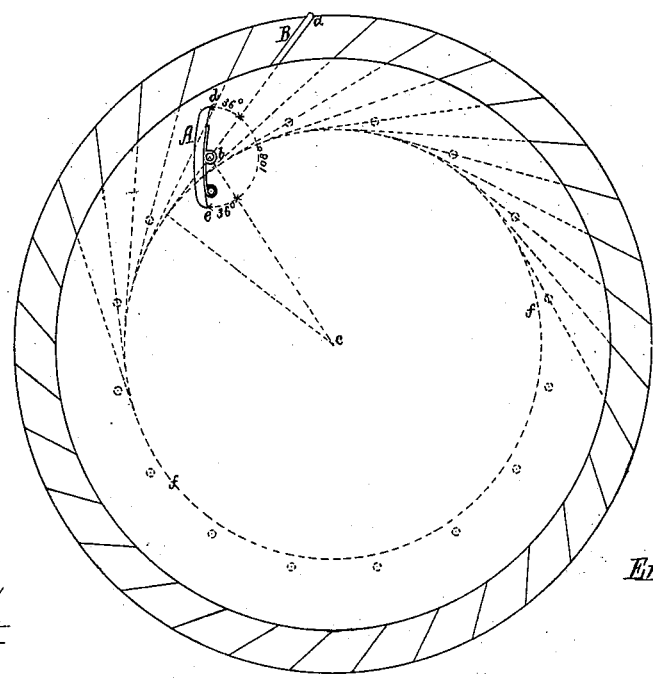

Fig. 4 is a diagram representing the mode of arranging the slats of the shrouding. In such figure A denotes a vane of the wheel, and B one of the slats of the blind or shrouding. The angle *a b c*, made by the lines *a b*, *b c*, is one hundred and eight degrees, each angle *d b a* and *e b c* being equal and making thirty-six degrees. Each of the other vanes of the wheel is arranged in a direction of a tangent to the dotted circle $f$, to which the line $a\ b$ is tangential, such circle $f$ being concentric with the wheel and its shrouding.

From the above it will be seen that each of the slats is arranged to stand in a plane tangential to a circle concentric with the wheel and having a radius corresponding in length to that of the longer side of a right-angled triangle whose hypotenuse equals the radius of the wheel, or properly the distance between the axis of the wheel and that of one of its vanes.

What I claim as my invention is as follows, viz:

1. The combination of weighted arms D D, as shown, applied to the wind-wheel shaft $a$, and provided with toothed sectors G G, as described, with the toothed gear C, adapted to turn on such shaft and connected to the revoluble vanes of the wheel by rods $e$, pivoted to them and the said gear, all being as and for the purpose and to operate substantially as set forth.

2. The wind-wheel annular blind constructed substantially as described—that is, with its slats disposed in planes tangential to a circle concentric with the wheel and having a radius corresponding to the longer side of a right-angled triangle whose hypotenuse equals the distance between the axis of the wheel and that of one of its vanes.

3. The combination of the sleeve H, the furcated lever I, and the arms $k\ k$ with the weighted arms D D and their toothed sectors G G, and wheel C, applied to the shaft and to the vanes of the wind-wheel A, substantially as set forth.

EMORY BANGS COOK.

Witnesses:
WILLIAM A. McKEAN,
ADDISON E. BULLARD.